(12) United States Patent
Kim et al.

(10) Patent No.: US 11,820,883 B2
(45) Date of Patent: Nov. 21, 2023

(54) RESIN FORMED BODY AND RESIN COMPOSITION

(71) Applicant: FURUKAWA ELECTRIC CO., LTD., Tokyo (JP)

(72) Inventors: Jae Kyung Kim, Tokyo (JP); Kenichi Suyama, Tokyo (JP); Suzune Ito, Tokyo (JP); Yukihiro Ikura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 260 days.

(21) Appl. No.: 17/199,859

(22) Filed: Mar. 12, 2021

(65) Prior Publication Data

US 2021/0198462 A1  Jul. 1, 2021

Related U.S. Application Data

(63) Continuation of application No. PCT/JP2019/045073, filed on Nov. 18, 2019.

(30) Foreign Application Priority Data

Nov. 20, 2018 (JP) .................. 2018-217610

(51) Int. Cl.
*C08L 101/12* (2006.01)
*C08L 23/12* (2006.01)

(52) U.S. Cl.
CPC ............ *C08L 101/12* (2013.01); *C08L 23/12* (2013.01); *C08L 2205/00* (2013.01); *C08L 2205/035* (2013.01)

(58) Field of Classification Search
CPC .... C08L 101/12; C08L 23/12; C08L 2205/00; C08L 2205/035
See application file for complete search history.

(56) References Cited

U.S. PATENT DOCUMENTS

| 6,271,288 | B1 | 8/2001 | Yamaguchi et al. |
| 2002/0161131 | A1 | 10/2002 | Kitano et al. |
| 2019/0023882 | A1 | 1/2019 | Kim et al. |

FOREIGN PATENT DOCUMENTS

| CN | 1365996 A | 8/2002 |
| CN | 1373145 A | 10/2002 |
| CN | 102558613 A | 7/2012 |
| CN | 108834420 A | 11/2018 |
| JP | 55-131031 A | 10/1980 |
| JP | 10-1575 A | 1/1998 |
| JP | 10-231392 A | 9/1998 |
| JP | 11-158294 A | 6/1999 |
| JP | 11-217468 A | 8/1999 |
| JP | 2000-86832 A | 3/2000 |
| JP | 2001-98081 A | 4/2001 |
| JP | 2002-348416 A | 12/2002 |
| JP | 5047414 B2 | 10/2012 |
| WO | WO 2013/081138 A1 | 6/2013 |
| WO | WO2017/170747 A1 | 10/2017 |

OTHER PUBLICATIONS

International Search Report, issued in PCT/JP2019/045073, PCT/ISA/210, dated Feb. 25, 2020.
"Quantifying Polymer Crosslinking Density Using Rheology and DMA," TA Instruments, RH102-1, 2022, 3 pages total.
"TA No. 86 DSC Measurement of Polypropylene," Hitachi High-Tech Science Corporation, 2008, pp. 1-2.
Extended European Search Report for corresponding European Application No. 19887566.8, dated Jul. 22, 2022.
Author Unknown, Polymer Blending Modification (3rd Edition), 2017, p. 184, 3 pages total.
Cai et al., "Study on the Mechanical Properties of Wood-Plastic Composite Based on PP/PE," Journal of Hangzhou Normal University (Natural Science Edition), vol. 11, No. 1, 2012, pp. 17-21, 5 pages total, with an English abstract.
Chinese Office Action and Search Report for corresponding Chinese Application No. 201980058057.8, dated Jan. 12, 2022, with an English translation.
Wu et al., "Preparation of High Melt Strength PP," China Plastics, vol. 14, No. 6, 2000, pp. 39-44, 6 pages total, with an English abstract.
"Plastics Compounders (Medium, Advanced) Training Turraces," Culture Development Press, 1st Edition, Jan. 2017, pp. 12-13 (4 pages total).
Author Unknown, Polymeric Materials, China Light Industry Press, 1st Edition, Jan. 2009, pp. 47-48 (4 pages total).
Chinese Office Action and Search Report for corresponding Chinese Application No. 201980058057.8, dated Jul. 8, 2022, with English translation.
Japanese Office Action for corresponding Japanese Application No. 2020-558375, dated Sep. 20, 2022, with English translation.
Chinese Office Action for corresponding Chinese Application No. 201980058057.8, dated Nov. 22, 2022, with English translation.

*Primary Examiner* — Patrick D Niland
(74) *Attorney, Agent, or Firm* — Birch, Stewart, Kolasch & Birch, LLP

(57) ABSTRACT

A resin formed body, having a diffraction peak at a position where a scattering vector s is 3.86±0.1 nm$^{-1}$ in a wide-angle X-ray diffraction measurement, and having at least one melting peak each at respective regions of 129° C. or lower and 159° C. or higher in a differential scanning calorimetry, and with which a peak of tan δ is observed in a range of −40±10° C. in a dynamic viscoelastic measurement, and a resin composition suitable for preparing the same.

5 Claims, No Drawings

RESIN FORMED BODY AND RESIN COMPOSITION

CROSS-REFERENCE TO RELATED APPLICATIONS

This application is a Continuation of PCT International Application No. PCT/JP2019/045073 filed on Nov. 18, 2019, which claims priority under 35 U.S.C. § 119 (a) to Japanese Patent Application No. 2018-217610 filed in Japan on Nov. 20, 2018. Each of the above applications is hereby expressly incorporated by reference, in its entirety, into the present application.

TECHNICAL FIELD

The present invention relates to a resin formed body containing cellulose fibers and a resin composition appropriate for preparation thereof.

BACKGROUND ART

A technique is known in which a reinforcing component and the like is mixed with a resin to modify physical properties of the resin for various usages. For example, a polyolefin reinforced resin composition obtained by mixing a polyolefin resin with a woody material, such as cellulose fiber, used paper, and pulp, and homogenizing it has been proposed.

In the field related to automobiles, there is an increasing demand for weight reduction of vehicles, for example, from a standpoint of resource saving and a standpoint of fuel efficiency improvement. Since many reinforced resin compositions containing woody materials are lightweight and have high rigidity, they are attracting attention as the materials for automobile components and the like that realize weight reduction. For example, a reinforced resin composition obtained by mixing a polypropylene resin with a cellulose fiber and homogenizing it is used as a material for the automobile components and the like.

Further, a technique for enhancing impact strength of a resin by adding a rubber component is known. For example, Patent Literature 1 discloses a thermoplastic resin composition in which vulcanized acid-modified nitrile rubber is dispersed in shape of particles inside a matrix phase of a thermoplastic resin having an amino group, as a resin composition having improved mechanical strength, such as impact resistance strength, without deteriorating the characteristics of the resin, such as heat resistance.

CITATION LIST

Patent Literatures

Patent Literature 1: Japanese Patent No. 5047414

SUMMARY OF INVENTION

Technical Problem

The inventors of the present invention have studied about the physical properties of formed bodies using the above-described conventional reinforced resin composition, and they have found out the following problems: the formed body by the above-described reinforced resin composition containing the polypropylene resin and the cellulose fiber is excellent in rigidity but not sufficient in the point of impact resistance strength, while the formed body by the reinforced resin composition to which the rubber component is added has enhanced impact resistance strength but reduced rigidity.

The present invention is contemplated to provide a resin formed body that realizes achieving both characteristics of rigidity and impact resistance at a desired excellent level, and a resin composition appropriate for preparation of this formed body.

Solution to Problem

That is, the above-described object of the present invention has been achieved by the following means.

(1)

A resin formed body, having a diffraction peak at a position where a scattering vector s is 3.86±0.1 nm$^{-1}$ in a wide-angle X-ray diffraction measurement, and having at least one melting peak each at respective regions of 129° C. or lower and 159° C. or higher in a differential scanning calorimetry, and with which a peak of tan δ is observed in a range of −40±10° C. in a dynamic viscoelastic measurement.

(2)

The resin formed body according to (1), in which a ratio ([$\Delta H_{PE}/\Delta H_{PP}$]×100) of a melting heat quantity ($\Delta H_{PE}$) of a component having the melting peak in the region of 129° C. or lower to a melting heat quantity ($\Delta H_{PP}$) of a component having the melting peak in the region of 159° C. or higher, in the differential scanning calorimetry, is more than 5% and less than 250%.

(3)

The resin formed body according to (1) or (2), in which the peak value of tan δ is between 0.03 and 0.05.

(4)

The resin formed body according to any one of (1) to (3), which has the at least one melting peak each in a range of 124±5° C. and a range of 164±5° C. in the differential scanning calorimetry.

(5)

A resin composition for use in preparation of the resin formed body according to any one of (1) to (4), wherein the resin composition has a diffraction peak at a position where a scattering vector s is 3.8610.1 nm$^{-1}$ in the wide-angle X-ray diffraction measurement and has at least one melting peak each at respective regions of 129° C. or lower and 159° C. or higher in the differential scanning calorimetry.

Effects of Invention

The resin formed body of the present invention is excellent in both rigidity and impact resistance and can be used for various kinds of use applications, as members or materials and the like, such as automobile parts, to which impact resistance in addition to rigidity are required.

Further, the resin composition of the present invention can be appropriately used for preparation of the above-described resin formed body.

MODE FOR CARRYING OUT THE INVENTION

<Resin Formed Body>

The resin formed body of the present invention has a peak of tan δ (loss tangent) in a range of −40±10° C. in a dynamic viscoelastic measurement. In the dynamic viscoelastic measurement, appearance of the peak of tan δ in the range of −40±10° C., which is a temperature range sufficiently lower than a room temperature (25° C.), means that the resin formed body of the present invention has motility (shows viscosity) in a certain high level at the room temperature. The appearance of the peak of tan δ in the above-described temperature range is considered to contribute to improvement of impact resistance. The resin formed body preferably has the peak of tan δ in a range of −50 to −36° C.

In the resin formed body of the present invention, the above-described peak value (peak height) of tan δ is preferably 0.03 to 0.05. When the resin formed body has the peak value in the above-described range, a ratio of the amount of a component with high motility to the amount of components other than that becomes appropriate, and while rigidity at the room temperature (for example, flexural modulus) is maintained, the impact resistance can be further improved.

The dynamic viscoelastic measurement is conducted in conformity to JIS K7244. More specifically, the dynamic viscoelasticity is determined by methods and conditions described in Examples.

The resin formed body of the present invention has a diffraction peak at a position where a scattering vector s is $3.86 \pm 0.1$ nm$^{-1}$ in a wide-angle X-ray diffraction measurement, and has at least one melting peak each at respective regions of 129° C. or lower and 159° C. or higher in a differential scanning calorimetry. The diffraction peak at the position where the scattering vector s is $3.86 \pm 0.1$ nm$^{-1}$ in the wide-angle X-ray diffraction measurement is a diffraction peak derived from a (004) plane of $I_\beta$ type crystal of cellulose in a cellulose fiber. The melting peak in the region of 129° C. or lower and the melting peak in the region of 159° C. or higher in the differential scanning calorimetry are each a melting peak mainly derived from a base resin constituting the resin formed body. That is, the resin formed body of the present invention contains the base resin and the cellulose fiber.

The resin formed body of the present invention may have at least one melting peak each in the above-described respective temperature regions in the differential scanning calorimetry, and also includes an aspect having a plurality of melting peaks in the respective temperature regions.

The melting peaks in the above-described two temperature regions may be derived from a single resin or may be derived from a plurality of resins.

The resin formed body preferably has the melting peak in the region of 129° C. or lower in the differential scanning calorimetry in the region of 128° C. or lower.

The wide-angle X-ray diffraction measurement and the differential scanning calorimetry can be conducted by the respective methods and conditions described in the Examples.

The resin formed body of the present invention preferably has at least one melting peak each in a range of $124 \pm 5°$ C. and a range of $164 \pm 5°$ C. in the differential scanning calorimetry. Such a resin formed body is, for example, in a form having a polyethylene resin and a polypropylene resin in combination as the base resin.

A ratio ($100 \times [\Delta H_{PE}/\Delta H_{PP}]$) of a melting heat quantity ($\Delta H_{PE}$) of a component having the melting peak in the region of 129° C. or lower to a melting heat quantity ($\Delta H_{PP}$) of a component having the melting peak in the region of 159° C. or higher, in the differential scanning calorimetry, is preferably more than 5% and less than 250%, and more preferably 50% or more and 180% or less.

The formed body of the present invention preferably contains a polyolefin resin as the base resin.

As the base resin, a polypropylene resin and a polyethylene resin are preferably used. A ratio of contents of the polypropylene resin to the polyethylene resin (polypropylene resin/polyethylene resin, mass ratio) is preferably 95/5 to 50/50, more preferably 95/5 to 60/40, and even more preferably 90/10 to 65/35.

The resin formed body of the present invention preferably has a cross-linkage structure. When having the cross-linkage structure, the resin formed body easily becomes in a form having the peak of tan δ in the temperature range of $-40 \pm 10°$ C. which is a lower temperature than the room temperature.

The cross-linkage structure mentioned here has a meaning including a cross-linkage structure (a) formed between polymer molecules constituting the base resin (for example, the polyethylene resin), and cross-linkage structure (b) formed between a polymer molecule constituting the base resin and a cellulose molecule constituting the cellulose fiber. That is, the resin formed body preferably has such cross-linkage structures (a) and/or (b).

These cross-linkage structures can be formed by reacting a raw material of the resin formed body in the presence of, for example, an organic peroxide. Specifically, hydrogen atoms are pulled out from a main chain of the polymer molecule of the base resin and a main chain of the polymer molecule of the cellulose fiber by a radical generated from the organic peroxide, and the cross-linkage structure between carbon atoms of the polymer molecule of the base resin and the cross-linkage structure between carbon atoms of the base resin and the cellulose fiber are formed.

Further, when the resin formed body contains an acid-modified polyethylene resin described later, an ester bond formed by reacting a carboxy group and the like which the acid-modified polyethylene resin has with a hydroxyl group of the cellulose fiber is also included in the above-described cross-linkage structure.

The phrase "having the cross-linkage structure" means at least partially having the cross-linkage structure. That is, "having the cross-linkage structure" means that at least a part of a cross-linkable portion of the raw material of the resin formed body is cross-linked, and all the cross-linkable portions may be cross-linked.

It is preferable that the resin formed body of the present invention contains the polyethylene resin and at least a part thereof (preferably a part) is the acid-modified polyethylene resin.

When the polyethylene resin is contained and at least a part thereof contains the acid-modified polyethylene resin, dispersibility of the cellulose fiber in the resin formed body can be enhanced. This is considered to be caused because the acid-modified polyethylene resin is structurally similar in the main chain portion to the polyethylene resin included in the base resin and can make the base resin be in a state of being highly compatible with other components, and because the interaction of the carboxy group and the like that resides in the acid-modified polyethylene resin and the surface of the cellulose fiber contributes.

It is more preferable that the resin formed body of the present invention contains the polyethylene resin as the base resin and at least a part thereof (preferably a part) is the acid-modified polyethylene resin and has the cross-linkage structure.

When a part of the polyethylene resin is the acid-modified polyethylene resin, the acid-modified polyethylene resin is preferably contained in 0.2 to 3% by mass in 100% by mass of the base resin, and more preferably contained in 0.5 to 2% by mass.

Further, a proportion of the acid-modified polyethylene resin to all the polyethylene resin constituting the base resin (acid-modified polyethylene resin/all the polyethylene resin, mass ratio) is preferably 0.01 to 0.10.

The content of the cellulose fiber in the above-described resin formed body is preferably 10 to 100 parts by mass with respect to 100 parts by mass of the base resin, and more preferably 25 to 66.7 parts by mass.

The above-described resin formed body may further contain an inorganic filler in addition to the cellulose fiber in a range that does not impair the effects of the present invention.

The resin formed body of the present invention preferably has a flexural modulus measured in accordance with JIS K7171 of 2500 MPa or more, more preferably 2878 MPa or more, and even more preferably 2900 MPa or more. The upper limit is not particularly limited, but 3030 MPa or less is practical.

Further, an impact strength measured in accordance with JIS K7111 is preferably 4.0 kJ/m$^2$ or more, and more preferably 5.0 kJ/m$^2$ or more. The upper limit is not particularly limited in a range that does not impair the flexural modulus. This upper limit depends on types of the base resin but can be, for example, 50 kJ/m$^2$ or less.

The following describes the raw materials used for the resin formed body of the present invention. In addition, the organic peroxide used in preparing a resin composition described later and the resin formed body will also be described.

The base resin for use in the resin formed body of the present invention only needs to be one that exhibits the above-described two melting peaks when one or more kinds in combination of the base resin is used to form a formed body. As the base resin, the polyolefin resin is preferred, and a combination of the polypropylene resin and the polyethylene resin is more preferred.

When the polypropylene resin and the polyethylene resin are used as the base resin, a resin other than the polypropylene resin or the polyethylene resin may be further contained as the base resin in a range that does not impair the effects of the present invention.

Further, the base resin can contain various kinds of commonly used additives, such as antioxidants, light stabilizers, plasticizers, flame retardants and the like in a range that does not impair the effects of the present invention.

—Polypropylene Resin—

The polypropylene resin preferably has at least a part of polypropylene forming a crystalline structure at a normal temperature (25° C.) in the resin formed body. When the differential scanning calorimetry (DSC measurement) is conducted on the resin formed body containing such a polypropylene resin, the melting peak associated with melting of the polypropylene crystal is observed at 164±5° C.

Specific examples of the polypropylene resin include a propylene homopolymer, a propylene-ethylene random copolymer, a propylene-α-olefin random copolymer, a propylene-ethylene-α-olefin copolymer, and a propylene block copolymer (copolymer composed of a propylene homopolymer component or copolymer component mainly composed of propylene, and a copolymer component obtained by copolymerizing at least one kind of monomer selected between ethylene and α-olefin with propylene). These polypropylene resins may be used singly or two or more kinds thereof may be used in combination. Note that, in the present invention, the resin containing both an ethylene component and a propylene component is classified as the polypropylene resin.

The α-olefin for use in the polypropylene resin is preferably at least one kind among 1-butene, 1-pentene, 1-hexene, 4-methyl-1-pentene, 1-octene, and 1-decene, and more preferably at least one kind among 1-butene, 1-hexene, and 1-octene.

Specific examples of the propylene-α-olefin random copolymer include a propylene-1-butene random copolymer, a propylene-1-hexene random copolymer, and a propylene-1-octene random copolymer.

Specific examples of propylene-ethylene-α-olefin copolymer include a propylene-ethylene-1-butene copolymer, a propylene-ethylene-1-hexene copolymer, and a propylene-ethylene-1-octene copolymer. These are preferably random copolymers.

Specific examples of the propylene block copolymer include a (propylene)-(propylene-ethylene) copolymer, a (propylene)-(propylene-ethylene-1-butene) copolymer, a (propylene)-(propylene-ethylene-1-hexene) copolymer, a (propylene)-(propylene-1-butene) copolymer, a (propylene)-(propylene-1-hexene) copolymer, a (propylene-ethylene)-(propylene-ethylene) copolymer, a (propylene-ethylene)-(propylene-ethylene-1-butene) copolymer, a (propylene-ethylene)-(propylene-ethylene-1-hexene) copolymer, a (propylene-ethylene)-(propylene-1-butene) copolymer, a (propylene-ethylene)-(propylene-1-hexene) copolymer, a (propylene-1-butene)-(propylene-ethylene) copolymer, a (propylene-1-butene)-(propylene-ethylene-1-butene) copolymer, a (propylene-1-butene)-(propylene-ethylene-1-hexene) copolymer, a (propylene-1-butene)-(propylene-1-butene) copolymer, and a (propylene-1-butene)-(propylene-1-hexene) copolymer.

Among these polypropylene resins, the propylene homopolymer, the propylene-ethylene random copolymer, the propylene-1-butene random copolymer, a propylene-ethylene-1-butene random copolymer, and the propylene block copolymer are preferred, and one kind or two or more kinds of these can be used as the polypropylene resin.

A melt flow rate (MFR) of the polypropylene resin is preferably 0.1 to 100 g/10 minutes, and more preferably 10 to 30 g/10 minutes. For the polypropylene, it is the value under a load of 2.16 kg at 230° C. in accordance with JIS K7210.

The density of the polypropylene resin is preferably 0.90 to 0.91 g/cm$^3$.

—Polyethylene Resin—

The polyethylene resin is preferably a resin at least a part of which forms a crystalline structure at a normal temperature (25° C.) in the resin formed body. When the differential scanning calorimetry (DSC measurement) is conducted on the resin formed body containing such a polyethylene resin, the melting peak associated with melting of the polyethylene crystal is observed at 124±5° C. Even when the acid-modified polyethylene resin described later is used, the melting peak associated with melting of the polyethylene crystal is also observed at 124±5° C.

Specific examples of the polyethylene resin include an ethylene homopolymer, and an ethylene-α-olefin copolymer. As this α-olefin, at least one kind among 1-butene, 1-pentene, 1-hexene, and 1-octene is preferred.

Specific examples of the ethylene-α-olefin copolymer include an ethylene-1-butene copolymer, an ethylene-1-pentene copolymer, an ethylene-1-hexene copolymer, and an ethylene-1-octene copolymer. These are preferably random copolymers.

When classified by density or properties and the like, any polyethylene resin among high-density polyethylene (HDPE), low-density polyethylene (LDPE), very-low-density polyethylene (VLDPE), linear low-density polyethylene (LLDPE), and ultra-high molecular weight polyethylene (UHMW-PE) may be used.

The polyethylene resin may be a polyethylene resin subjected to acid modification or may contain the polyethylene resin subjected to acid modification together with a polyethylene resin not subjected to acid modification. That is, when the "polyethylene resin" is referred in the present invention, it has a meaning including the polyethylene resin subjected to acid modification.

Specific examples of the polyethylene resin subjected to acid modification include those obtained by graft-modifying a polyethylene resin with, for example, an unsaturated carboxylic acid or a derivative thereof. Examples of the unsaturated carboxylic acid include maleic acid, fumaric acid, itaconic acid, acrylic acid, and methacrylic acid, and specific examples of the derivative of unsaturated carboxylic acid include maleic acid anhydride, itaconic acid anhydride, methyl acrylate, ethyl acrylate, butyl acrylate, glycidyl acrylate, methyl methacrylate, ethyl methacrylate, butyl methacrylate, glycidyl methacrylate, monoethyl maleate, diethyl maleate, monomethyl fumarate, and dimethyl fumarate. As the derivative of unsaturated carboxylic acid, an unsaturated carboxylic acid anhydride is preferred. Among these unsaturated carboxylic acids and/or derivatives thereof, the maleic acid anhydride is preferred.

The amount of acid modification (content of carboxylic acid or derivative thereof) in the acid-modified polyethylene resin is not particularly limited but is preferably 1 to 10% by mass with respect to the polyethylene resin (before modification), and more preferably 1 to 5% by mass.

A melt flow rate (MFR) of the polyethylene resin is preferably 0.1 to 100 g/10 minutes, and more preferably 1 to 10 g/10 minutes. Note that, unless otherwise noted, the MFR is the mass of the polymer that flows out per 10 minutes (g/10 minutes) under a load of 2.16 kg at 190° C. in accordance with JIS K7210.

The density of the polyethylene resin is preferably 0.92 to 0.96 g/cm$^3$.

When two or more kinds of polyethylene resins are contained, the density of at least one kind of the polyethylene resins is preferably 0.92 to 0.96 g/cm$^3$.

—Cellulose Fiber—

The cellulose fiber has high strength and high rigidity as compared with the base resin. In view of this, the cellulose fiber reinforces the base resin and enhances the rigidity of the resin formed body.

The cellulose fiber for use in the present invention is a fibrous cellulose. Because of having industrial utilization methods established and being easily available, a plant fiber-derived cellulose fiber is preferred, and a fine plant fiber-derived cellulose fiber (powdered pulp) is particularly preferred.

The pulp is also a raw material for paper and consists primarily of a tracheid which is extracted from a plant. From a chemical viewpoint, a primary constituent of the pulp is a polysaccharide and its primary constituent is cellulose.

The plant fiber-derived cellulose fiber is not particularly limited, and specific examples thereof include a material derived from plant, such as wood, bamboo, hemp, jute, kenaf, agricultural product remains or wastes (for example, straw of wheat or rice plant, corn, stalks of cotton and the like, and sugar cane), cloth, regenerated pulp, waste paper, and wood flour. In the present invention, a wood or a material derived from the wood is preferable, wood flour is more preferable, and a kraft pulp is particularly preferable.

Meanwhile, the kraft pulp is a collective term of the pulp in which lignin and hemicellulose have been removed from a wood or plant raw material by a chemical processing with caustic soda or the like, whereby almost pure cellulose has been extracted. The kraft pulp is composed of cellulose molecules as main components, and hemicellulose and lignin Generally, the plant fiber-derived cellulose fiber forms a structure in which 30 to 40 molecules are bundled to form an ultra-super narrow and highly crystalline microfibril with a diameter of about 3 nm and a length of several hundreds of nm to several tens of μm and these are bundled via a soft non-crystalline portion. The powdery cellulose (powdered pulp) preferably used as the raw material of the present invention is this bundle-shaped aggregation.

Note that when the cellulose fiber is referred in the present invention, it is used with the meaning that not only the bundle of the above-described microfibrils (non-defiberized state) but also those in the state of the microfibrils generated by being defiberized is included.

An average fiber diameter of the cellulose fiber is not particularly limited and can be appropriately selected according to use application and the like. The average fiber diameter is preferably 1 to 50 μm, and more preferably 5 to 30 μm.

An average fiber length of the cellulose fiber is not particularly limited and can be appropriately selected according to use application and the like. The average fiber length is preferably 10 to 3000 μm, and more preferably 20 to 2500 μm.

The above-described average fiber diameter and the average fiber length are obtained by defining the long side of the cellulose fiber observed with an electron microscope as the fiber length and the short side as the fiber diameter and averaging them.

When the cellulose fiber is contained in the resin formed body, a cellulose crystal is always contained. Therefore, when the wide-angle X-ray diffraction measurement is conducted on the resin formed body, the diffraction peak derived from the cellulose crystal is observed at the position where the scattering vector s is 3.86±0.1 nm$^{-1}$.

—Inorganic Filler—

The inorganic filler has high strength and high rigidity as compared with the base resin. In view of this, the inorganic filler reinforces the base resin and enhances the rigidity of the resin formed body.

The inorganic filler for use in the present invention is not particularly limited, and the inorganic filler usually used for a reinforced resin formed body can be used without particular limitation. The inorganic filler preferably has a surface having a part that can be chemically bonded by hydrogen bond, covalent bond, or the like, or an intermolecular bond with the base resin and the like. Specific examples of such an inorganic filler include talc, calcium carbonate, and aluminum hydroxide.

Since an average grain diameter of the inorganic filler varies depending on the type and purpose of the inorganic filler used, it is not particularly limited. When the talc is used as the inorganic filler, the average grain diameter of the talc is preferably 0.1 to 50 μm. The average grain diameter of the inorganic filler can be obtained by observing the resin formed body with the electron microscope, defining the maximum length of the inorganic filler grain on an observation surface as the grain diameter, and averaging the grain diameters of 50 grains.

—Other Components—

Other than the above, the resin formed body of the present invention can appropriately include other components, such as an antioxidant, a light stabilizer, a radical scavenger, an ultraviolet absorber, a colorant (dye, organic pigment, inorganic pigment), a filler, a lubricant, a plasticizer, a processing aid such as acrylic processing aid, a foaming agent, a lubricant agent such as paraffin wax, a surface treatment agent, a crystal nucleating agent, a mold release agent, a hydrolysis inhibitor, an antiblocking agent, an antistatic agent, an antifogging agent, an antifungal agent, an ion trapping agent, a flame retardant, and a flame retardant aid, in a range that does not impair the above-described purpose.

—Organic Peroxide—

The organic peroxide at least functions to generate radicals by pyrolysis to cause a reaction for forming the above-described cross-linkage structure. The organic peroxide generally used for reinforced resin formed bodies and the like can be used without particular limitation.

The organic peroxide is a compound having a carbon atom and a —O—O— bond, and examples thereof include ketone peroxide, a peroxy ketal, hydro peroxide, a dialkyl peroxide, an acyl peroxide, an alkyl perester, a diacyl peroxide, a monoperoxy carbonate, and a peroxy dicarbonate.

Among these, in the present invention, a peroxy ketal, a dialkyl peroxide, a diacyl peroxide, an alkyl peroxyester, and a monoperoxy carbonate are preferred, and in particular, a dialkyl peroxide is preferred.

Specific examples of the organic peroxide include the followings examples:

(1) Ketone Peroxide Compounds

Cyclohexanone peroxide, linear methylethyl ketone peroxide, and the like (2) Peroxy Ketal Compounds 1,1-bis(t-butylperoxy)-3,3,5-trimethylcyclohexane, 1,1-bis(t-butylperoxy cyclohexane, 2,2-bis(t-butylperoxy)octane, n-butyl-4,4-bis(t-butylperoxy)valerate, 2,2-bis(t-butylperoxy)butane, cyclic methylethyl ketone peroxide, and the like (3) Hydro Peroxide Compounds t-butyl peroxide, t-butylcumyl peroxide, and the like (4) Dialkyl Peroxide Compounds Di t-butyl peroxide, t-butylcumyl peroxide, dicumyl peroxide, α,α'-bis(t-butylperoxy-m-isopropyl)benzene, 2,5-dimethyl-2,5-di(t-butylperoxy)hexane, 2,5-dimethyl-2,5-di(t-butylperoxy)hexyne-3, and the like (5) Acyl Peroxide Compounds Acetyl peroxide, isobutyryl peroxide, octanoyl peroxide, decanoyl peroxide, lauroyl peroxide, 3,5,5-trimethylhexanoyl peroxide, succinic acid peroxide, benzoyl peroxide, 2,4-dichlorobenzoyl peroxide, m-toluoyl peroxide, and the like (6) Alkyl Peroxyester Compounds t-Butyl peroxyacetate, t-butyl peroxyisobutylate, t-butyl peroxypivalate, t-butyl peroxyneodecanoate, cumylperoxyneodecanoate, t-butyl peroxy-2-ethyl hexanoate, t-butyl peroxyl-3,5,5-trimethyl hexanoate, t-butyl peroxylaulate, t-butyl peroxybenzoate, di t-butyl peroxy isophthalate, 2,5-dimethyl-2,5-di (benzoylperoxy)hexane, t-butyl peroxymaleic acid, t-butyl peroxyisopropyl carbonate, cumyl peroxyoctoate, t-hexylperoxy neodecanoate, t-hexyl peroxypivalate, t-butyl peroxyneohexanoate, t-hexyl peroxyneohexanoate, cumyl peroxyneohexanoate, and the like (7) Diacyl Peroxide Compounds Diacetyl peroxide, diisobutyl peroxide, dioctanoyl peroxide, didecanoyl peroxide, dilauloyl peroxide, bis(3,5,5-trimethylhexanoyl) peroxide, dibenzoyl peroxide, bis(2,4-dichlorobenzoyl) peroxide, bis(m-toluoyl) peroxide, and the like (8) Monoperoxy Carbonate Compounds t-Butyl peroxyisopropyl carbonate, t-amyl peroxy-2-ethylhexyl carbonate, and the like (9) Peroxy Dicarbonate Compounds Di n-propyl peroxy dicarbonate, diisopropyl peroxy dicarbonate, di s-butyl peroxy dicarbonate, bis(4-t-butylcyclohexyl)peroxy dicarbonate, bis(2-ethylhexyl peroxy dicarbonate, and the like In the present invention, the 1-minute half-life temperature of the organic peroxide is preferably from 130 to 190° C.

Herein, the half-life of the organic peroxide means a period of time until the amount of its active oxygen is reduced, due to a heat decomposition of the organic peroxide, by half of the amount before the decomposition. The 1-minute half-life temperature refers to the temperature at which the half-life becomes one minute.

If the 1-minute half-life temperature of the organic peroxide is too high, a temperature setting of the twin screw extruder becomes difficult. In reverse, if it is too low, the organic peroxide itself becomes unstable, which results in decomposition during storage.

By setting the 1-minute half-life temperature of the organic peroxide to the range as described above, a normally conducted heat kneading by a twin screw extruder is facilitated.

The 1-minute half-life temperature of the organic peroxide is evaluated by preparing a 0.1 mole/L concentration of the organic peroxide solution using a relatively inactive solvent such as benzene and the like, and then measuring a temporal alteration in concentration of the organic peroxide when subjected to a heat decomposition (see "Kakyo-zai Handbook (Crosslinking Agent Handbook in English) (first edition)" published by Taiseisha Co., Ltd., p. 162).

The RO• (radical) derived from decomposition of the organic peroxide is formed by pulling hydrogens out respectively from the base resin and the cellulose fiber. It is presumed that the radicals formed from the base resin and the radicals formed from the cellulose fiber are reacted to bond with each other, whereby the base resin and the cellulose are interfacially adhered to each other.

The above-described interfacial adhesion reaction can be expressed as follows, taking polyethylene as an example of the base resin.

{Chemical formula 1}

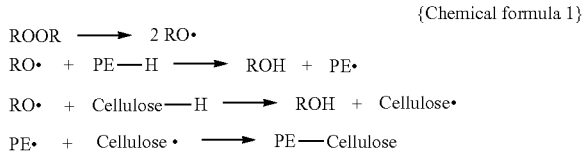

Herein, PE-H stands for polyethylene and Cellulose-H stands for cellulose fiber. PE• and Cellulose• each stand for the formed radical.

According to the resin formed body of the present invention, both rigidity and impact resistance can be achieved at a high level. Although the reason is not yet clear, one of the causes is considered to be that by using the cellulose fiber and the base resin to make a configuration showing the specific melting peaks, a high motility region is formed in the formed body and this high motility region absorbs the impact. It is considered that this allows both the rigidity and the impact resistance to be achieved in the resin formed body in a well-balanced manner.

<Resin Composition>

The resin composition of the present invention is a resin composition appropriate for preparing the above-described resin formed body, and the resin composition has the diffraction peak at the position where the scattering vector s is $3.86\pm0.1$ nm$^{-1}$ in the wide-angle X-ray diffraction measurement, and has at least one melting peak each at regions of 129° C. or lower and 159° C. or higher in the differential scanning calorimetry.

The resin composition of the present invention preferably has at least one melting peak each in the range of 124±5° C. and the range of 164±5° C. in the differential scanning calorimetry.

The resin composition of the present invention preferably contains, as components thereof, the above-described base resin and cellulose fiber, more preferably contains the polyolefin resin and the cellulose fiber, and even more preferably contains the polypropylene resin, the polyethylene resin, and the cellulose fiber.

The resin composition of the present invention may further contain the above-described additives, solvent, and the like.

The polypropylene resin, the polyethylene resin, the cellulose fiber, and additives other than above are the same as those described for the above-described resin formed body, and the preferred configurations are also the same. The preferred contents of the respective components in the resin composition are also the same to the preferred contents described for the resin formed body described above.

The resin composition of the present invention may have or need not have the peak of tan δ in the range of −40±10° C. in the dynamic viscoelastic measurement.

<Methods for Producing Resin Formed Body and Resin Composition>

The method for producing the resin composition of the present invention is not particularly limited, as long as the producing method can obtain the resin composition having the above-described specific diffraction peak and melting peaks by using each of the above-described components.

The method for producing the resin formed body of the present invention is not particularly limited, as long as the producing method can obtain the formed body having the above-described specific diffraction peak, melting peaks, and peak of tan δ by using each of the above-described components.

The following describes one aspect of a preferable method for producing the resin composition and the resin formed body of the present invention by using a case where the polypropylene resin and the polyethylene resin are used as the base resin as an example. Even when a resin other than these resins is used as the base resin, production can be made in the same manner except that the raw materials are changed.

The method for producing the resin composition of the present invention preferably has a process A that melt-kneads the cellulose fiber, the polypropylene resin, and the polyethylene resin.

In the process A, the above-described melt-kneading may be conducted in the presence of the organic peroxide. That is, one aspect of the method for producing the resin composition of the present invention is a production method including the process that melt-kneads the cellulose fiber, the polypropylene resin, and the polyethylene resin in the presence of the organic peroxide. By conducting melt-kneading in the presence of the organic peroxide, the radicals generated from the organic peroxide can cause a cross-linking reaction between the base resins and the like, to obtain the resin composition containing the above-described cross-linkage structure.

Using the acid-modified polyethylene resin as a part of the polyethylene resin at the time of the above-described melt-kneading is also preferred.

In the process A, the melt-kneading may be conducted using the acid-modified polyethylene resin as a part of the polyethylene resin and further in the presence of the organic peroxide.

In the process A, the sequence of mixing each of the above-described raw material components is not particularly limited, and the above-described components may be mixed in any sequence.

For example, a composition a containing the polypropylene resin and the cellulose fiber may be prepared in advance, and the composition a, the polyethylene resin, and the organic peroxide may be melt-kneaded. Further, a mixture b containing the polyethylene resin and the organic peroxide may be prepared in advance, and the mixture b, the polypropylene resin, and the cellulose fiber may be melt-kneaded. Furthermore, a composition c in which the polyethylene resin and the organic peroxide are melt-kneaded and reacted may be prepared in advance, and the composition c, the polypropylene resin, and the cellulose fiber may be melt-kneaded.

In the process A, each raw material component is preferably blended in a blending amount so that the content of each component in the resin composition is within the above-described range.

In the process A, a ratio of the blending amounts of the polypropylene resin to the polyethylene resin (polypropylene resin/polyethylene resin, mass ratio) is preferably 95/5 to 50/50, more preferably 95/5 to 60/40, and even more preferably 90/10 to 65/35.

In the aspect in which the melt-kneading is conducted in the presence of the organic peroxide in the process A, the blending amount of the organic peroxide is preferably 0.001 to 0.1 parts by mass with respect to 100 parts by mass of the base resin, more preferably 0.005 to 0.08 parts by mass, and even more preferably 0.005 to 0.05 parts by mass.

In the aspect in which the melt-kneading is conducted in the presence of the organic peroxide in the process A, the blending amount of the organic peroxide with respect to the polyethylene resin (organic peroxide/polyethylene resin, mass ratio) is preferably 0.01 to 0.2, and more preferably 0.05 to 0.15.

In the aspect in which the melt-kneading is conducted in the presence of the organic peroxide in the process A, a melt-kneading temperature is not particularly limited as long as the temperature is higher than the 1-minute half-life temperature of the organic peroxide. The melt-kneading temperature is preferably determined using, as an index, the higher temperature (temperature A) between the melting peak temperature on the high temperature side (melting point, 159° C. or higher) of the base resin and the temperature which is approximately 20° C. higher than the 1-minute half-life temperature of the organic peroxide. For example, the melt-kneading temperature is preferably set to a temperature of about (temperature A) to (temperature A+20° C.).

In the aspect in which the melt-kneading is conducted in the presence of the organic peroxide in the process A, the melt-kneading temperature is preferably 170 to 230° C., although depending on the types of the organic peroxide and base resin used.

In the aspect in which the melt-kneading is conducted without using the organic peroxide in the process A, the melt-kneading temperature can be set to, for example, a temperature which is the same as or higher than the melting point on the higher temperature side of the base resin used. This melt-kneading temperature is preferably 170 to 230° C., and more preferably 180 to 200° C.

The melt-kneading temperature in the process A preferably has the upper limit set to a temperature at which pyrolysis of the cellulose fiber is less. Therefore, the upper limit temperature is preferably 300° C. or lower, more preferably 250° C. or lower, and even more preferably 230° C. or lower.

A kneading time in the process A can be appropriately set.

Equipment used for the melt-kneading is not particularly limited as long as the melt-kneading is possible at the temperature at which the organic peroxide is pyrolyzed or at the melting temperature of the base resin, and specific examples include a blender, a kneader, a mixing roll, a Banbury mixer, and an extruder with a single screw or twin screws. The twin-screw extruder is preferred.

From the viewpoint of operability during forming, an obtained melt-kneaded product is preferably processed into a pellet form.

Each component may be dry blended prior to the melt-kneading.

Thus, the resin composition of the present invention can be obtained.

The resin formed body of the present invention is preferably produced through a step in which at least the polypropylene resin, the polyethylene resin, and the cellulose fiber are melt-kneaded, and the melt-kneaded product is formed into an intended shape. The melt-kneading can be conducted in the same manner as in the melt-kneading (process A) in the above-described method for producing the resin composition. The forming can be conducted by an ordinary forming process, such as injection molding or extrusion forming. Further, production by melting the resin composition of the present invention and forming the melted product into an intended shape is also preferred. The melting temperature in a case where the resin composition of the present invention is melted can be set in the same manner as the above-described melt-kneading temperature.

In particular, by adjusting the temperature at the time of melt-kneading and/or the melting temperature of the melted product used at the time of forming as described above, the formed body having the above-described specific diffraction peak, melting peaks, and peak of tan δ tends to be efficiently formed.

Further, in the above-described forming process, for example, also by setting a molding die temperature at the time of injection molding to a temperature which is 50 to 90° C. lower than the melting peak temperature on the low temperature side (melting point, 129° C. or lower) of the base resin, the formed body having the above-described specific diffraction peak, melting peaks, and peak of tan δ can be formed.

The resin formed body of the present invention can be used as materials of products, components and/or members, and the like below. For example, transport equipment (automobile, motorcycle, train, aircraft, and the like), a structural member of a robot arm, a component of an amusement robot, a member of an artificial limb, a material of a home appliance, a housing of OA equipment, information processing equipment, a mobile terminal, a building material, a film for plastic greenhouse, drainage equipment, a material of a toiletry product, various kinds of tanks, a container, a sheet, a packing material, a toy, and sport goods, are included.

The material for the transport equipment includes a vehicle material. The vehicle material includes, for example, interior components, such as a door trim, a pillar, an instrumental panel, a console, a rocker panel, an arm rest, a door inner panel, a spare tire cover, a door knob, and a light; exterior components, such as a bumper, a spoiler, a fender, a side step, and a door outer panel; and in addition, an air intake duct, a coolant reservoir tank, a radiator reservoir tank, a window washer tank, a fender liner, a rotating member, such as a fan and a pulley; a component, such as a wire harness protector, a connection box or a connector, and an integrally molded component, such as a front end panel.

EXAMPLES

The present invention will be described in more detail based on examples given below, but the invention is not meant to be limited by these.

In the examples and comparative examples below, "parts" means "mass parts" unless otherwise stated.

—Used Materials—

The following shows the used materials.

(1) Polyolefin Resin
  High-density polyethylene resin (MFR=5 g/10 minutes (190° C./2.16 kg), density=0.953 g/cm$^3$)
  Polypropylene resin (MFR=15 g/10 minutes (230° C./2.16 kg), density=0.900 g/cm$^3$)
  Maleic acid anhydride-modified polyethylene resin (MFR (190° C./2.16 kg)=9.0 g/10 minutes)
(2) Cellulose Fiber
  B400 (Product name, manufactured by Rettenmaier Co. Ltd., average fiber diameter 20 μm, average fiber length 900 μm)
(4) Organic Peroxide
  Dialkyl peroxide A (manufactured by NOF Corporation, Product name: Perhexa 25B) (1-minute half-life temperature: 179.8° C.)

Example 1

The polypropylene resin, the cellulose fiber, the high-density polyethylene resin, the maleic acid anhydride-modified polyethylene resin, and the organic peroxide were loaded into a hopper of a twin-screw extruder (KZWI5TW-45MG-NH manufactured by Technovel Corporation) with a screw diameter 15 mm and L/D=45 by a feeder controlled with each supply mass per hour so that the amounts shown in Table 1 were fed. A polyolefin resin composition was obtained by setting a barrel temperature 20° C. higher than the 1-minute half-life temperature of the organic peroxide, and melt-kneading at a screw rotation speed of 100 rpm. The obtained polyolefin resin composition was pelletized.

The polyolefin resin composition pellets obtained above were dried at 80° C. for 24 hours and molded at a molding die temperature of 40° C. with an injection molding machine (manufactured by FANUC, Product name: ROBOSHOT α-S30iA) (melting temperature 200° C.), and a JIS K7139 multipurpose test specimen (resin formed body) was prepared.

Examples 2 to 5

A polyolefin resin composition was obtained in the same manner as in Example 1 except that the blending amounts of the polypropylene resin, the high-density polyethylene resin, the maleic acid anhydride-modified polyethylene resin, and the organic peroxide were changed to the respective blending amounts shown in Table 1, and the above-described test specimens were further prepared.

Example 6

A polyolefin resin composition was obtained in the same manner as in Example 4 except that the maleic acid anhydride-modified polyethylene resin was not blended in and that the blending amount of the high-density polyethylene resin was changed to the blending amount shown in Table 1, and the above-described test specimen was further prepared.

Example 7

A polyolefin resin composition was obtained in the same manner as in Example 1 except that the blending amounts of the polypropylene resin, the high-density polyethylene resin, the maleic acid anhydride-modified polyethylene resin, and the organic peroxide were changed to the respective blending amounts shown in Table 1, and the above-described test specimen was further prepared.

Comparative Example 1

A polyolefin resin composition was obtained in the same manner as in Example 1 except that the blending amount of the polypropylene resin shown in Table 1 was applied and that the high-density polyethylene resin, the maleic acid anhydride-modified polyethylene resin, and the organic peroxide were not blended in, and the above-described test specimen was further prepared.

Comparative Example 2

A polyolefin resin composition was obtained in the same manner as in Example 4 except that the maleic acid anhydride-modified polyethylene resin and the organic peroxide were not blended in and that the blending amount of the high-density polyethylene resin was changed to the blending amount shown in Table 1, and the above-described test specimen was further prepared.

(Dynamic Viscoelastic Measurement)

Test specimens having a width of 2 mm, a thickness of 1 mm, and a length of 40 mm were cut out from the above-described JIS K7139 multipurpose test specimens and were provided for the dynamic viscoelasticity test. A measuring device was RSA-G2 (product name, manufactured by TA Instruments), and a measuring temperature range was a temperature range from −90° C. to 150° C., a temperature rising rate was 5° C./min, a measuring frequency was 1 Hz, a grip span length was set to 20 mm, and a strain was set to 0.05%.

Using a curved line (vertical axis: tan δ, horizontal axis: temperature) obtained by the measurement in the above-described dynamic viscoelasticity test, a position of the peak (peak temperature) of tan δ was obtained.

Further, the peak value of tan δ was defined as the local maximum value (peak height) of the tan δ at the point where the tan δ became local maximum in the range from −50° C. to −30° C. (range of −40±10° C.) of the curved line obtained by the above-described measurement.

(Differential Scanning Calorimetry)

For the differential scanning calorimetry, the measurement was conducted using TA-60A (product name, manufactured by Shimadzu Corporation). The JIS K7139 multipurpose test specimens were cut into 5 to 10 mg, packed in an aluminum pan, set in the above-described device, and a temperature rise measurement was conducted under the condition of 10° C./min in a temperature range of 40° C. to 200° C. Using software TA60 (product name, manufactured by Shimadzu Corporation) on the obtained DSC curve, melting peak temperatures and melting heat quantities (peak areas, $\Delta H_{PE}$ and $\Delta H_{PP}$) in a range from the start point of the melting peak to the end point were each obtained according to the set "specified ranges". When the two melting peaks could not be clearly distinguished, an intersection point of a rise where the apex of the first melting peak (the one with the apex of the melting peak was in the range of 129° C. or lower, for example, the melting peak of the polyethylene) headed for the end point and a rise where the apex of the second melting peak (the one with the apex of the melting peak was in the range of 159° C. or higher, for example, the melting peak of the polypropylene) headed for the start point was defined as a boundary, using TA60, to obtain the melting heat quantity of each melting peak.

(Wide-Angle X-Ray Diffraction Measurement, Method for Confirming the Presence of Cellulose)

The verification was conducted by the wide-angle X-ray diffraction measurement using D8 DISCOVER (product name, manufactured by Bruker AXS GmbH). Diffraction obtained by irradiating the test specimens which were set with a sample stage tilted at θ=17.3° with CuKα rays with a pinhole collimator narrowed to φ 1.0 mm was detected by a two-dimensional detector VANTEC500 (product name, manufactured by Bruker AXS GmbH) which was installed with a camera length of 10 cm, to obtain a two-dimensional diffraction image. In ranges of s=1.13 to 4.44 nm$^{-1}$ and 2θ=10 to 40°, the obtained two-dimensional diffraction image was subjected to integration averaging processing in an azimuth angle direction of 0 to 120°, to obtain one-dimensional data. After the one-dimensional data was corrected by subtracting air scattering according to the transmittance of X-rays, curve fitting was performed using the Gaussian function to separate a diffraction component derived from the polyethylene and polypropylene crystal and a diffraction component derived from the cellulose fiber. When the diffraction peak was observed in a range of s=3.85 to 3.87 nm$^{-1}$, the cellulose fiber was determined to be present in the formed body. This is because the diffraction peak derived from the (004) plane of the cellulose fiber usually appears in the range of s=3.85 to 3.87 nm$^{-1}$.

(Evaluation Method of Flexural Modulus)

The flexural modulus was evaluated as an index of rigidity.

The flexural modulus (MPa) of the multipurpose test specimens prepared above was measured under the condition of test speed: 2 mm/min by a universal testing machine (manufactured by Shimadzu Corporation, product name: Autograph AGS-X) in accordance with JIS K7171.

The specimens having the flexural modulus of 2500 MPa or more were regarded as passed.

(Evaluation Method of Impact Resistance)

Charpy impact strength (impact strength) was evaluated as an index of impact resistance.

As the impact resistance of the multipurpose test specimens prepared above, the notched Charpy impact strength was measured by an impact tester (manufactured by Toyo Seiki Co., Ltd., IT type) in accordance with JIS K7111.

The specimens having the impact strength of 4.0 kJ/m$^2$ or more were regarded as passed.

TABLE 1

| Composition | Ex 1 | Ex 2 | Ex 3 | Ex 4 | Ex 5 | Ex 6 | Ex 7 | CEx 1 | CEx 2 |
|---|---|---|---|---|---|---|---|---|---|
| Polypropylene Resin (parts) | 95 | 90 | 80 | 70 | 60 | 70 | 50 | 100 | 70 |
| Cellulose Fiber (parts) | 42.9 | 42.9 | 42.9 | 42.9 | 42.9 | 42.9 | 42.9 | 42.9 | 42.9 |
| High-density polyethylene resin (parts) | 4.75 | 9.5 | 19 | 28.5 | 38 | 30 | 47.5 | — | 30 |
| Maleic acid anhydride-modified polyethylene resin (parts) | 0.25 | 0.5 | 1 | 1.5 | 2 | — | 2.5 | — | — |
| Organic peroxide (parts) | 0.005 | 0.010 | 0.020 | 0.030 | 0.040 | 0.030 | 0.050 | — | — |
| Diffraction peak at $3.86 \pm 0.1$ nm$^{-1}$ | Observed | Observed | Observed | Observed | Observed | Observed | Observed | Observed | Observed |
| Peak of tan δ in the range of $-40 \pm 10°$ C. (the numbers in parenthesis show peak temperature (° C.)) | Observed (−37.5) | Observed (−38.8) | Observed (−36.7) | Observed (−36.5) | Observed (−36.6) | Observed (−36.5) | Observed (−35.4) | Not observed | Not observed |
| Peak height of tan δ | 0.039 | 0.0476 | 0.0481 | 0.0488 | 0.0455 | 0.038 | 0.041 | — | — |
| Melting peak at 129° C. or lower (° C.) | 126.3 | 126.5 | 126.8 | 127 | 127.5 | 127.1 | 128.8 | — | 127.5 |
| Melting peak at 159° C. or higher (° C.) | 164.5 | 164.5 | 164.3 | 164.1 | 164.1 | 164.1 | 163.8 | 164.2 | 164.1 |
| $100 \times \Delta H_{PE}/\Delta H_{PP}$ (%) | 8.8 | 20.4 | 66.2 | 90.3 | 179.8 | 93.1 | 212.8 | 0 | 85.5 |
| Flexural modulus (MPa) | 3001 | 2987 | 2955 | 2919 | 2890 | 2942 | 2561 | 3029 | 2857 |
| Impact strength (notched) (kJ/m$^2$) | 4.1 | 4.6 | 5.2 | 5.2 | 5.2 | 4.9 | 4.9 | 2.7 | 3.1 |

Note:
"Ex" stands for example, and "CEx" stands for comparative example

As shown in Table 1, Comparative examples 1 and 2 in which no clear peak of tan δ was observed in the range of −40±10° C. had the Charpy impact strength of 2.7 kJ/m$^2$ and 3.1 kJ/m$^2$, respectively, and were inferior in impact resistance.

In contrast to this, each of Examples 1 to 7 which contained the cellulose fiber, had the above-described two specific melting peaks, and had the peak of tan δ in the specific temperature range, had sufficiently high rigidity with superior flexural modulus and exhibited the value of the Charpy impact strength exceeding 4.0 kJ/m$^2$. That is, achieving both characteristics of rigidity and impact resistance was realized at a high level. In Examples 1 to 7, with respect to Comparative example 1 in which only the polypropylene resin was used as the base resin, the flexural modulus could be maintained at 85% or more and the Charpy impact strength could be improved to 150% or more.

Having described our invention as related to the embodiments and the examples, it is our intention that the invention not be limited by any of the details of the description, unless otherwise specified, but rather be construed broadly within its spirit and scope as set out in the accompanying claims.

This application claims priority on Patent Application No. 2018-217610 filed in Japan on Nov. 20, 2018, which is entirely herein incorporated by reference.

The invention claimed is:

1. A resin formed body, containing polyethylene resin which has a melt flow rate of 5 g/10 minutes to 100 g/10 minutes, having a diffraction peak at a position where a scattering vector s is 3.86±0.1 nm$^{-1}$ in a wide-angle X-ray diffraction measurement, and having at least one melting peak each at respective regions of 129° C. or lower and 159° C. or higher in a differential scanning calorimetry, and with which a peak of tan δ is observed in a range of −40±10° C. in a dynamic viscoelastic measurement.

2. The resin formed body according to claim 1, in which a ratio ([ΔHPE/ΔHPP]×100) of a melting heat quantity ($\Delta H_{PE}$) of a component having the melting peak in the region of 129° C. or lower to a melting heat quantity ($\Delta H_{PP}$) of a component having the melting peak in the region of 159° C. or higher, in the differential scanning calorimetry, is more than 5% and less than 250%.

3. The resin formed body according to claim 1, in which the peak value of tan δ is between 0.03 and 0.05.

4. The resin formed body according to claim 1, which has the at least one melting peak each in a range of 124±5° C. and a range of 164±5° C. in the differential scanning calorimetry.

5. A resin composition for use in preparation of the resin formed body according to claim 1, wherein the resin composition contains polyethylene resin which has a melt flow rate of 5/10 minutes to 100 g/10 minutes, has a diffraction peak at a position where a scattering vector s is 3.86±0.1 nm$^{-1}$ in the wide-angle X-ray diffraction measurement and has at least one melting peak each at respective regions of 129° C. or lower and 159° C. or higher in the differential scanning calorimetry.

\* \* \* \* \*